(12) United States Patent
Witehira et al.

(10) Patent No.: US 7,626,594 B1
(45) Date of Patent: Dec. 1, 2009

(54) INTERACTIVE THREE DIMENSIONAL DISPLAY WITH LAYERED SCREENS

(75) Inventors: Pita Witehira, Hamilton (NZ); Gabriel Daemon Engel, Hamilton (NZ)

(73) Assignee: Puredepth Limited, Auckland (NZ)

( * ) Notice: Subject to any disclaimer, the term of this patent is extended or adjusted under 35 U.S.C. 154(b) by 0 days.

(21) Appl. No.: 10/048,638

(22) PCT Filed: Aug. 1, 2000

(86) PCT No.: PCT/NZ00/00143

§ 371 (c)(1),
(2), (4) Date: Feb. 1, 2002

(87) PCT Pub. No.: WO01/09664

PCT Pub. Date: Feb. 8, 2001

(30) Foreign Application Priority Data

Aug. 1, 1999 (NZ) ........................ 336212

(51) Int. Cl.
*G09G 5/00* (2006.01)
(52) U.S. Cl. ............................ 345/619; 345/4; 345/419
(58) Field of Classification Search ............... 345/4, 345/6, 419, 619, 1.1, 173, 1.2, 9; 348/14.03, 348/14.07, 564, 588, 840; 463/37; D14/127, D14/373
See application file for complete search history.

(56) References Cited

U.S. PATENT DOCUMENTS

| | | | |
|---|---|---|---|
| 3,863,246 A | 1/1975 | Trcka et al. | |
| 4,239,349 A | 12/1980 | Scheffer | |
| 4,294,516 A | 10/1981 | Brooks | |
| 4,333,715 A | 6/1982 | Brooks | |
| 4,371,870 A | 2/1983 | Biferno | |
| 4,423,929 A | 1/1984 | Gomi | |
| 4,443,062 A | 4/1984 | Togashi et al. | |
| 4,472,737 A | 9/1984 | Iwasaki | |
| 4,523,848 A | 6/1985 | Gorman et al. | |
| 4,556,286 A | 12/1985 | Uchida et al. | |
| 4,562,433 A * | 12/1985 | Biferno | ......................... 345/4 |
| 4,568,928 A * | 2/1986 | Biferno | ......................... 345/5 |
| 4,648,691 A | 3/1987 | Oguchi et al. | |
| 4,649,425 A | 3/1987 | Pund | |

(Continued)

FOREIGN PATENT DOCUMENTS

AU  82482/98  9/1998

(Continued)

OTHER PUBLICATIONS

"Clearboard 1991-1994," http://web.media.mit.edu/~ishii/CB.html.

(Continued)

*Primary Examiner*—Matthew C Bella
*Assistant Examiner*—Gregory F Cunningham

(57) ABSTRACT

An interactive imaging system (1) with a perception of depth includes at least two screens (2) configured to show a three dimensional image, where the user can manipulate the image via control means (3). The control means (3) can comprise touch screen controls, or means adjacent to the screens such as buttons, touchpads or a joystick. Image information may be transmitted over the Internet or other communication means. Applications include computer games and simulators. Advertising messages may be displayed on one screen while images are being displayed on other screens.

37 Claims, 2 Drawing Sheets

U.S. PATENT DOCUMENTS

| | | | |
|---|---|---|---|
| 4,712,869 A * | 12/1987 | Claxton John C. | 359/453 |
| 4,768,300 A | 9/1988 | Rutili | |
| 4,927,240 A | 5/1990 | Stolov et al. | |
| 4,947,257 A | 8/1990 | Fernandez et al. | |
| 5,049,870 A | 9/1991 | Fitzgerald et al. | |
| 5,091,720 A | 2/1992 | Wood | |
| 5,112,121 A | 5/1992 | Chang et al. | |
| 5,113,272 A | 5/1992 | Reamey | |
| 5,124,803 A | 6/1992 | Troxel | |
| 5,198,936 A | 3/1993 | Stringfellow | |
| 5,255,028 A * | 10/1993 | Biles | 353/7 |
| 5,255,356 A | 10/1993 | Michelman et al. | |
| 5,283,560 A | 2/1994 | Bartlett | |
| 5,289,297 A * | 2/1994 | Bollman et al. | 358/537 |
| 5,317,686 A | 5/1994 | Salas et al. | |
| 5,333,255 A | 7/1994 | Damouth | |
| 5,361,165 A | 11/1994 | Stringfellow et al. | |
| 5,367,801 A | 11/1994 | Ahn | |
| 5,396,429 A | 3/1995 | Hanchett | |
| 5,416,890 A * | 5/1995 | Beretta | 345/590 |
| 5,416,895 A | 5/1995 | Anderson et al. | |
| 5,418,898 A | 5/1995 | Zand et al. | |
| 5,463,724 A | 10/1995 | Anderson et al. | |
| 5,465,101 A | 11/1995 | Akiba et al. | |
| 5,473,344 A | 12/1995 | Bacon et al. | |
| 5,475,812 A | 12/1995 | Corona et al. | |
| 5,479,185 A * | 12/1995 | Biverot | 345/6 |
| 5,502,805 A | 3/1996 | Anderson et al. | |
| 5,585,821 A | 12/1996 | Ishikura et al. | |
| 5,590,259 A | 12/1996 | Anderson et al. | |
| 5,600,462 A | 2/1997 | Suzuki et al. | |
| 5,600,765 A | 2/1997 | Ando et al. | |
| 5,604,854 A | 2/1997 | Glassey | |
| 5,623,591 A | 4/1997 | Cseri | |
| 5,638,501 A | 6/1997 | Gough et al. | |
| 5,651,107 A | 7/1997 | Frank et al. | |
| 5,663,746 A | 9/1997 | Pellenberg et al. | |
| 5,664,127 A | 9/1997 | Anderson et al. | |
| 5,675,755 A | 10/1997 | Trueblood | |
| 5,694,150 A | 12/1997 | Sigona et al. | |
| 5,694,532 A | 12/1997 | Carey et al. | |
| 5,695,346 A | 12/1997 | Sekiguchi et al. | |
| 5,721,847 A | 2/1998 | Johnson | |
| 5,729,219 A | 3/1998 | Armstrong et al. | |
| 5,757,522 A | 5/1998 | Kulick et al. | |
| 5,764,317 A | 6/1998 | Sadovnik et al. | |
| 5,772,446 A | 6/1998 | Rosen | |
| 5,796,455 A | 8/1998 | Mizobata et al. | |
| 5,805,163 A | 9/1998 | Bagnas | |
| 5,825,436 A | 10/1998 | Knight | |
| 5,828,420 A | 10/1998 | Marshall et al. | |
| 5,831,615 A | 11/1998 | Drews et al. | |
| 5,835,088 A | 11/1998 | Jaaskelainen, Jr. | |
| 5,880,742 A | 3/1999 | Rao et al. | |
| 5,883,623 A | 3/1999 | Cseri | |
| 5,883,627 A | 3/1999 | Pleyer | |
| 5,883,635 A | 3/1999 | Rao et al. | |
| 5,890,174 A | 3/1999 | Khanna et al. | |
| 5,923,307 A | 7/1999 | Hogle, IV | |
| 5,924,870 A | 7/1999 | Brosh et al. | |
| 5,963,197 A | 10/1999 | Bacon et al. | |
| 5,999,191 A | 12/1999 | Frank et al. | |
| 6,005,654 A | 12/1999 | Kipfer et al. | |
| 6,016,385 A * | 1/2000 | Yee et al. | 700/245 |
| 6,018,379 A | 1/2000 | Mizobata et al. | |
| 6,031,530 A | 2/2000 | Trueblood | |
| 6,037,937 A | 3/2000 | Beaton et al. | |
| 6,057,814 A | 5/2000 | Kalt | |
| 6,061,110 A | 5/2000 | Hisatake et al. | |
| 6,072,489 A | 6/2000 | Gough et al. | |
| 6,075,531 A | 6/2000 | DeStefano | |
| 6,085,202 A | 7/2000 | Rao et al. | |
| 6,097,361 A | 8/2000 | Rohner | |
| 6,100,862 A | 8/2000 | Sullivan | |
| 6,111,614 A | 8/2000 | Mugura et al. | |
| 6,118,427 A | 9/2000 | Buxton et al. | |
| 6,163,318 A | 12/2000 | Fukuda et al. | |
| 6,181,349 B1 * | 1/2001 | Bardon et al. | 345/619 |
| 6,204,902 B1 | 3/2001 | Kim et al. | |
| 6,215,490 B1 | 4/2001 | Kaply | |
| 6,215,898 B1 * | 4/2001 | Woodfill et al. | 382/154 |
| 6,239,852 B1 | 5/2001 | Oono et al. | |
| 6,246,407 B1 | 6/2001 | Wilks et al. | |
| 6,269,173 B1 | 7/2001 | Hsien | |
| 6,282,551 B1 | 8/2001 | Anderson et al. | |
| 6,300,990 B1 | 10/2001 | Yamaguchi et al. | |
| 6,317,128 B1 | 11/2001 | Harrison et al. | |
| 6,327,592 B1 | 12/2001 | Yoshikawa | |
| 6,341,439 B1 | 1/2002 | Lennerstad | |
| 6,351,298 B1 | 2/2002 | Mitsui et al. | |
| 6,356,281 B1 | 3/2002 | Isenman | |
| 6,369,830 B1 | 4/2002 | Brunner et al. | |
| 6,377,229 B1 * | 4/2002 | Sullivan | 345/6 |
| 6,418,426 B1 | 7/2002 | Schlesinger | |
| 6,438,515 B1 | 8/2002 | Crawford et al. | |
| 6,443,579 B1 | 9/2002 | Myers | |
| 6,466,185 B2 * | 10/2002 | Sullivan et al. | 345/6 |
| 6,468,157 B1 | 10/2002 | Hinami et al. | |
| 6,496,832 B2 | 12/2002 | Chi et al. | |
| 6,505,209 B1 | 1/2003 | Gould et al. | |
| 6,538,660 B1 | 3/2003 | Celi, Jr. et al. | |
| 6,587,094 B2 * | 7/2003 | Anderson | 345/168 |
| 6,587,118 B1 | 7/2003 | Yoneda | |
| 6,593,904 B1 | 7/2003 | Marz et al. | |
| 6,609,799 B1 | 8/2003 | Myers | |
| 6,610,102 B1 | 8/2003 | Aldred et al. | |
| 6,661,425 B1 * | 12/2003 | Hiroaki | 345/629 |
| 6,693,692 B1 | 2/2004 | Kaneko et al. | |
| 6,721,713 B1 | 4/2004 | Guheen et al. | |
| 6,725,422 B1 | 4/2004 | Bauchot et al. | |
| 6,760,003 B1 | 7/2004 | Sase | |
| 6,771,327 B2 | 8/2004 | Sekiguchi | |
| 6,845,578 B1 | 1/2005 | Lucas | |
| 6,859,907 B1 | 2/2005 | McGarry | |
| 2001/0026625 A1 * | 10/2001 | Azima et al. | 381/152 |
| 2002/0091728 A1 | 7/2002 | Kjaer et al. | |
| 2002/0093516 A1 | 7/2002 | Brunner et al. | |
| 2002/0163728 A1 | 11/2002 | Myers | |
| 2002/0163729 A1 | 11/2002 | Myers | |
| 2003/0069074 A1 * | 4/2003 | Jackson | 463/43 |
| 2003/0132895 A1 | 7/2003 | Berstis | |
| 2003/0184665 A1 | 10/2003 | Berstis | |
| 2004/0239582 A1 | 12/2004 | Seymour | |

FOREIGN PATENT DOCUMENTS

| | | | |
|---|---|---|---|
| AU | 24806/00 | | 7/2000 |
| AU | 24538/00 | | 8/2000 |
| AU | 68219/01 | | 12/2001 |
| CA | 2009960 | | 9/1990 |
| CA | 2075807 | | 8/1991 |
| CA | 2139696 | | 7/1995 |
| CA | 2320694 | | 8/1999 |
| DE | 2730785 | | 1/1979 |
| DE | 29912074 | | 11/1999 |
| DE | 19920789 | | 5/2000 |
| EP | 0389123 | | 9/1990 |
| EP | 454423 | * | 10/1991 |
| EP | 662669 | | 1/1994 |
| EP | 595387 | | 5/1994 |
| EP | 0703563 | | 3/1996 |
| EP | 0802684 | | 10/1997 |
| EP | 0935191 | | 8/1999 |
| EP | 1057070 | | 8/1999 |

| | | |
|---|---|---|
| EP | 0999088 | 5/2000 |
| EP | 1151430 | 8/2000 |
| EP | 1177527 | 11/2000 |
| EP | 1093008 | 4/2001 |
| EP | 1287401 | 3/2003 |
| GB | 2312584 | 10/1997 |
| GB | 2347003 | 8/2000 |
| GB | 2372618 | 8/2002 |
| IL | 93472 | 11/1994 |
| JP | 3021902 | 1/1991 |
| JP | 3174580 | 7/1991 |
| JP | 3226095 | 10/1991 |
| JP | 4191755 | 7/1992 |
| JP | 6274305 | 9/1994 |
| JP | 8-036375 | 2/1996 |
| JP | 8030388 | 2/1996 |
| JP | 8095741 | 4/1996 |
| JP | 09-033858 | 2/1997 |
| JP | 9-282357 | 10/1997 |
| JP | 9308769 | 12/1997 |
| JP | 9338769 | 12/1997 |
| JP | 103355 | 1/1998 |
| JP | 10039821 | 2/1998 |
| JP | 10105829 | 4/1998 |
| JP | 10228347 | 8/1998 |
| JP | 11205822 | 7/1999 |
| JP | 2001-215332 | 4/2002 |
| JP | 2002-350772 | 12/2002 |
| JP | 2002-099223 | 10/2003 |
| NO | 20005178 | 4/2001 |
| PL | 343229 | 4/2001 |
| WO | 91/12554 | 8/1991 |
| WO | WO98/47106 | 10/1998 |
| WO | 99/42889 | 8/1999 |
| WO | WO9942889 | * 8/1999 |
| WO | 00/36578 | 6/2000 |
| WO | 00/48167 | 8/2000 |
| WO | 00/68887 | 11/2000 |
| WO | 01/01290 | 1/2001 |
| WO | 01/15128 | 3/2001 |
| WO | 01/95019 | 12/2001 |
| WO | 021084637 | 10/2002 |
| WO | 02/091033 | 11/2002 |
| WO | 03/003109 | 1/2003 |
| ZA | 9703025 | 11/1997 |

OTHER PUBLICATIONS

"Teamworkstation 1989-1994," http://web.media.mit.edu/~ishii/TWS.html.
"Textarc: An Alternate Way to View a Text," http://textarc.org.
"Textarc: NYSCA Grant and Public Installation," http//textarc.org.
"Textarc: The Print and the Artist," http://textarc.org.
Courter et al., Microsoft Office 2000 Professional Edition, 1999, Sybex Inc., pp. xxxi, 543, 685.
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Office Action U.S. Appl. No. 10/048,966, filed Jan. 12, 2006.
Office Action U.S. Appl. No. 10/048,966, filed Jan. 27, 2005.
Office Action U.S. Appl. No. 10/048,966, filed Mar. 15, 2006.
Office Action U.S. Appl. No. 10/048,966, filed May 2, 2007.
Office Action U.S. Appl. No. 10/048,966, filed May 3, 2006.
Office Action U.S. Appl. No. 10/048,966, filed Jul. 14, 2005.
Office Action U.S. Appl. No. 10/048,966, filed Aug. 18, 2006.
Office Action U.S. Appl. No. 10/049,271, filed Feb. 5, 2005.
Office Action U.S. Appl. No. 10/049,271, filed Feb. 8, 2006.
Office Action U.S. Appl. No. 10/049,271, filed Mar. 2, 2007.
Office Action U.S. Appl. No. 10/049,271, filed May 18, 2005.
Office Action U.S. Appl. No. 10/049,271, filed Aug. 23, 2006.
Office Action U.S. Appl. No. 10/049,271, filed Nov. 17, 2004.
Office Action U.S. Appl. No. 10/049,272, filed Jan. 23, 2006.
Office Action U.S. Appl. No. 10/049,272, filed Mar. 25, 2008.
Office Action U.S. Appl. No. 10/049,272, filed May 21, 2007.
Office Action U.S. Appl. No. 10/049,272, filed Jul. 13, 2005.
Office Action U.S. Appl. No. 10/049,272, filed Jul. 26, 2004.
Office Action U.S. Appl. No. 10/049,272, filed Aug. 28, 2006.
Office Action U.S. Appl. No. 10/049,272, filed Oct. 12, 2007.
Office Action U.S. Appl. No. 10/049,272, filed Nov. 29, 2004.
Office Action U.S. Appl. No. 10/049,272, filed Dec. 14, 2007.
Office Action U.S. Appl. No. 10/049,272, filed Dec. 31, 2003.
Office Action U.S. Appl. No. 10/476,590, filed Mar. 3, 2006.
Office Action U.S. Appl. No. 10/476,590, filed Apr. 19, 2007.
Office Action U.S. Appl. No. 10/476,590, filed Oct. 6, 2006.
Office Action U.S. Appl. No. 10/476,590, filed Oct. 16, 2007.
Office Action U.S. Appl. No. 10/476,590, filed Oct. 16, 2007.
Office Action U.S. Appl. No. 10/489,101, filed Mar. 29, 2006.
Office Action U.S. Appl. No. 10/489,101, filed Jul. 16, 2007.
Office Action U.S. Appl. No. 10/489,101, filed Jul. 28, 2005.
Office Action U.S. Appl. No. 10/489,101, filed Nov. 22, 2005.
Office Action U.S. Appl. No. 10/048,966; Mail Date Sep. 18, 2007 Priority Date: Aug. 19, 1999.
Office Action U.S. Appl. No. 10/049,271; Mail Date Feb. 05, 2008 Priority Date: Aug. 19, 1999.
Office Action U.S. Appl. No. 10/049,271; Mail Date Aug. 05, 2008 Priority Date: Aug. 19, 1999.
Office Action U.S. Appl. No. 10/049,272; Mail Date Aug. 13, 2008 Priority Date: Aug. 19, 1999.
Office Action U.S. Appl. No. 10/049,272; Mail Date Dec. 24, 2008 Priority Date: Aug. 19, 1999.
Office Action U.S. Appl. No. 10/476,590; Mail Date Feb. 28, 2008 Priority Date: May 01, 2001.
Office Action U.S. Appl. No. 10/476,590; Mail Date Jun. 19, 2008 Priority Date: May 01, 2001.
Office Action U.S. Appl. No. 10/476,590; Mail Date Oct. 29, 2008 Priority Date: May 01, 2001.
Office Action U.S. Appl. No. 10/528,334; Mail Date Feb. 24, 2009 Priority Date: Sep. 20, 2002.
Office Action U.S. Appl. No. 10/528,334; Mail Date Aug. 05, 2008 Priority Date: Sep. 20, 2002.
Final OA Dated Dec. 24, 2008; U.S. Appl. No. 10/049272.
Final OA Dated Feb. 24, 2009; U.S. Appl. No. 10/528334.
Final OA Dated Mar. 18, 2009; U.S. Appl. No. 10/048966.
Final OA Dated Mar. 23, 2009; U.S. Appl. No. 10/476590.
Non-Final Office Action Dated Aug. 14, 2009; U.S. Appl. No. 10/049,272.
Non-Final Office Action Dated Sep. 4, 2009; U.S. Appl. No. 10/476,590.
Non-Final Office Action Dated Sep. 1, 2009; U.S. Appl. No. 10/528,334.
Non-Final Office Action Dated Sep. 9, 2009; U.S. Appl. No. 10/557,157.
Non-Final Office Action Dated Aug. 12, 2009; U.S. Appl. No. 12/107,589.

* cited by examiner

INTERACTIVE THREE DIMENSIONAL DISPLAY WITH LAYERED SCREENS

TECHNICAL FIELD

This invention relates to an improved method of displaying images and in particular to producing images with depth.

BACKGROUND ART

Since our eyes naturally perceive depth, it is seen as a disadvantage that most display systems are two dimensional. Furthermore, there are many applications of displays where the realism of depth would improve the effectiveness of the display. Thus many attempts have been made to create display systems with depth.

A number of display systems that present an image of depth have been developed. One class of such displays requires the viewer to wear some form of eye shield system by which various means allows the viewer's two eyes to see different images that are concurrently displayed on the same two dimensional screen. However, many users find it unsatisfactory to wear eye shields, while the method of providing two different images on the same screen is cumbersome and inconvenient for many applications.

A related but different class of displays presents a different image to each eye by means of a binocular image system in close proximity to both eyes. This method, however, is restricted in the number of viewers who can use the system and again many users find it unsatisfactory and uncomfortable to use.

A third class of display uses modifications of the two dimensional screen surface wherein two images are created on the screen, but by manipulation of multiple refractors on the screen, for a viewer in the correct position one image is refracted into the right eye, and the other image is refracted into the left eye.

This system requires the users to be carefully placed, is inflexible and has not found favour with many users.

The major problems with these systems were overcome by the innovative screen techniques disclosed in PCT Patent Application No's. PCT/NZ98/00098 and PCT/NZ99/00021 which detail a screen system producing a perception of depth comprising at least two screens placed such that their axes are approximately co-linear, with each screen separated from the other in the direction of the normal, wherein an image, or part of an image, displayed on one or more screens can be selectively made transparent, opaque or partially opaque as desired.

It has been found however that even with these types of screens there are some applications where the operator needs more control of the images, such as with computer games and other interactive programs—for example training programs.

All references, including any patents or patent applications, cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents forms part of the common general knowledge in the art, in New Zealand or in any other country.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided an interactive imaging system with depth, including at least two screens configured to show a 3-dimensional image, each screen being capable of simultaneously displaying independent images, characterised in that a user can manipulate one or more parts of any image independently displayed, by the means of using one or more on-screen touch control means.

It should be understood that in preferred embodiments of the present invention the 3 dimensional composite image, spread over two or more screens, can be interactive with any sort of controls, in particular with "touch" controls on a screen or on a clear panel in front of the front screen.

It should be further understood that in preferred embodiments the "touch" control can be activated by a variety of items including, but not limited to, pointers, pens, fingers or pencils.

One form of touch control means can be an image of a "button" on the front and/or rear screens which when touched can flip between 2 or more screens to show the information relating to the button, or can perform an operation associated with that button.

According to another aspect of the present invention there is provided an interactive imaging system with depth, including at least two screens configured to show a 3-dimensional image, each screen being capable of simultaneously displaying independent images, characterised in that at least one part of any image, independently displayed on one or more of the screens, can be manipulated by the actions of the user by using one or more control means.

In preferred embodiments of the present invention a user can manipulate one or more parts of any image by using one or more control means located on or near the screens, these control means can be in the form of a standard "keypress" button or a type of joystick control or may even be "touch" controls located on at least one touchpad adjacent to the screen, any of which can be readily purchased "off the shelf".

It would be clear to anyone skilled in the art that these are all "off the shelf" items that are readily available.

According to a further aspect of the present invention there is provided an interactive imaging system which creates a perception of depth, including at least two screens configured to show a 3-dimensional image, each screen being capable of simultaneously displaying independent images, characterised in that at least one part of any image, independently displayed on one or more of the screens, can be manipulated by the actions of the user by using one or more control means, and the information necessary to generate at least part of an image can be transmitted from or received by the display apparatus via the internet or by another suitable data transfer system.

In preferred embodiments of the present invention there is provided a method of controlling at least part of an image displayed on an interactive imaging system which creates a perception of depth including at least two screens configured to show a 3-dimensional image, each screen being capable of simultaneously displaying independent images, characterised by the step of manipulating, by the actions of the user, at least one or more parts of any image independently displayed on the interactive imaging system.

In some preferred embodiments of the present invention there is provided a method of controlling at least part of an image displayed on an interactive imaging system which creates a perception of depth including at least two screens configured to show a 3-dimensional image, each screen being capable of simultaneously displaying independent images, characterised by the step of sending or receiving the information necessary to generate any image on the interactive imaging system via the internet or by another suitable data transfer system.

In preferred embodiments of the present invention the images, or the data corresponding to the images, may be transmitted over the Internet or by other communication means for display at any compatible display unit, or in the absence of a suitable display unit, as one or more separate images simultaneously on a single screen display. The data corresponding to the images may be stored at any compatible remote location for processing or display.

Therefore the present invention has huge advantages over the display systems currently available as a far greater amount of data can be displayed on the display system.

Generally, data for front and rear images can be obtained and stored separately. Applications where this is appropriate can be in kiosks or booths, games, simulators, training devices and the like.

It should be understood that in preferred embodiments a "booth" is defined as an enclosed, or partially enclosed, walled area in which an activity can take place For example, a flight simulator in its simplest form may consist of two screens wherein the front screen may display the cockpit instruments, control settings and generally illustrate the interior of the cockpit, while the rear screen shows the image as seen through the cockpit windscreen—such as other aircraft, sky, cloud, grounds, the runway and so on, therefore giving the operator a sense of true perspective as different manoeuvres are simulated.

Either conventional instrument displays or "head-up" displays can be simulated with this invention, with the "touch-screen" ability improving the "playability" of these applications.

Display kiosks and booths in stores and also for other applications can be configured to show images of products, their use and typically pictorial data for describing, promoting and benefiting from the product on the rear screen, while written or symbolic information about the product can be shown on the front screen.

Alternatively, this order may be reversed, combined or arranged as appropriate for the preferred method of presentation.

The front screen may also have interactive functions such as touch controls, selectors and the like which allow the viewer to select or control either or all of the display screens.

Alternatively the controls may be separate from, but in close proximity to, the screen and still allow the user to manipulate or select separately or simultaneously what is displayed on each screen.

Kiosks and booths based on the invention may be used for a variety of advertising and information presentation purposes. For example, a customer may be attracted to the kiosk by the use of attractive 3 dimensional images which can then show advertising in an attractive and unobtrusive manner principally on one screen while other screens at different depths continue to keep the viewers attention. The viewer may be encouraged to concentrate on action occurring on one screen while advertising or other messages are unobtrusively shown on parts of another screen, typically the front screen, which may be mostly transparent.

This has a significant advantage over prior systems in that far more information can be displayed at any one time, for instance on a two screen system—twice the information is available to the operator than on a single screen system.

The use of kiosks based on the invention allows the dissemination of more advertising within the same footprint or floor area, while also enabling the advertising to be made less obtrusive and more acceptable to customers, allowing the advertising to be more effective.

In effect the available screen size within the same footprint or floor area is expanded allowing more information to be displayed and in a form where it becomes easier to be absorbed.

One huge advantage with the present invention over the systems previously available is that due to having either on-screen touch controls, or controls located adjacent to the screen system, the operator does not need to take their gaze away from the screen area in order to perform a control function.

This not only means that their concentration is not broken but also that they will be able to cope with a higher information rate.

There are a number of applications which are ideally suited to this aspect, in particular computer gaming where taking your eyes from the screen can affect your performance in an extremely adverse manner.

The use of the present invention means that a computer gamer for instance will have a much faster response time to any given situation and less likelihood of missing any on-screen event.

This has even further advantages when the image or images are transferred over the internet as the advantages disclosed previously can be applied to on-line applications.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
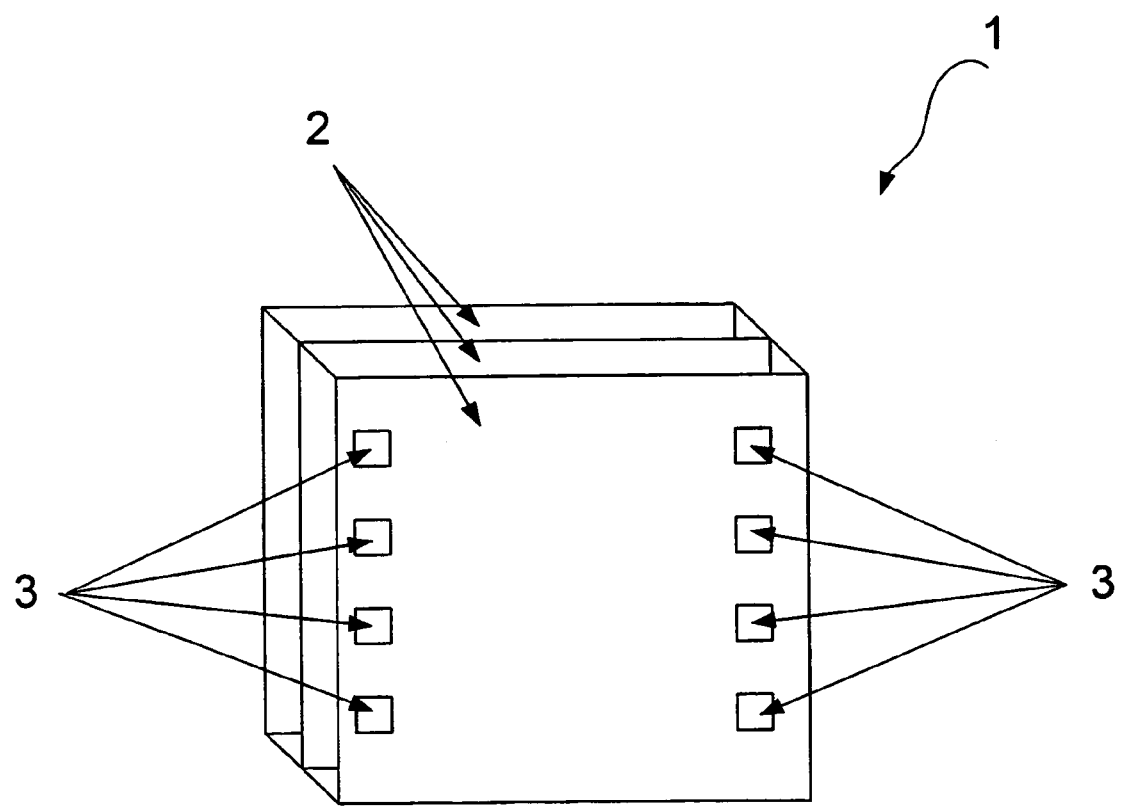
FIG. 1 This is a perspective representation of one preferred embodiment of the present invention.

With reference to FIG. 1 there is illustrated an interactive imaging system with a perception of depth generally indicated by arrow 1.

The interactive imaging system 1 is comprised of a number of parallel screens 2 configured in order they give a perception of depth.

An image, or part of an image, contained on one or more of the screens 2 can be manipulated by use of the on-screen touch controls 3.

It should be appreciated that the on-screen touch controls are of a known off-the-shelf type.

The on-screen touch controls 3 can be configured to perform a variety of functions including the switching of the screens to the foreground and the manipulation of part of an image from one screen to another.

It is envisaged that in some preferred modes of operation the interactive imaging system 1 will display three dimensional images on the screens 2 that have been transmitted to the interactive imaging system 1 via the internet.

Figure 2:
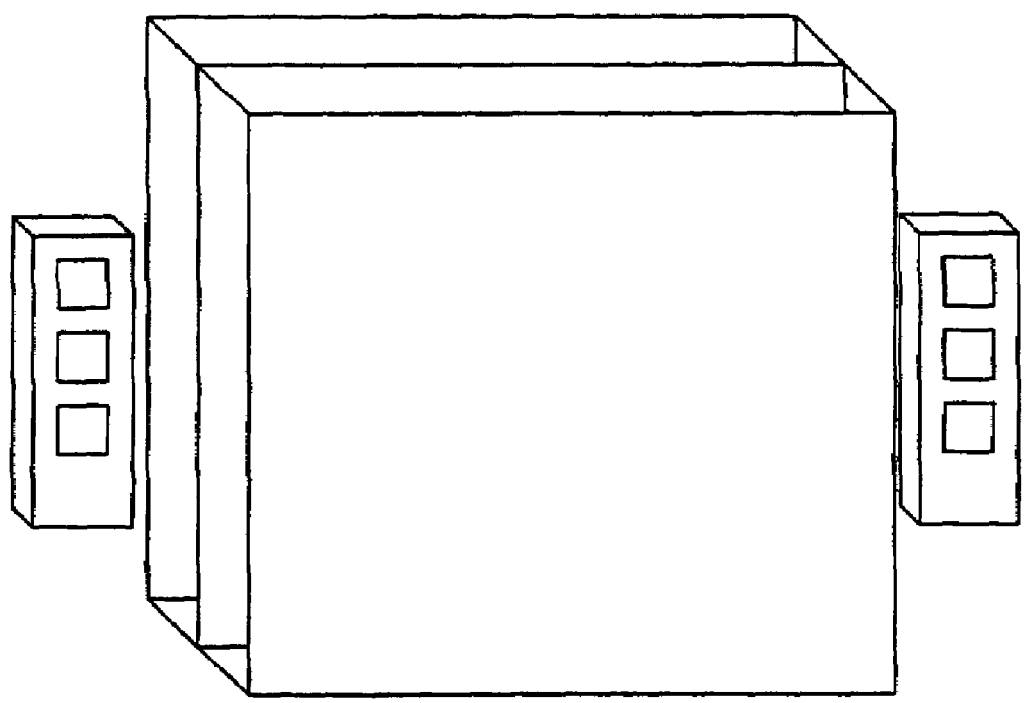
FIG. 2 This is a perspective representation of another preferred embodiment of the present invention.

With reference to FIG. 2 there is shown an interactive imaging system with a perception of depth where an image, or part of an image, contained on one or more of the screens 2 can be manipulated by use of controls at the side of the screen which work in the same manner as those in FIG. 1.

It should also be appreciated that these can be replaced by other controls such as an off-the-shelf type joystick.

Aspects of the present invention have been described by way of example only and it should be appreciated that modifications and additions may be made thereto without departing from the scope thereof.

We claim:

1. An interactive imaging system comprising:
    a first display screen for displaying a first graphical object, said first graphical object generated using a first active matrix of physical pixels disposed at said first display screen;
    a second display screen for displaying a second graphical object, said second graphical object generated using a second active matrix of physical pixels disposed at said second display screen, said second display screen further for displaying said second graphical object simultaneously with said display of said first graphical object, wherein said second display screen overlaps said first display screen, and wherein a portion of said first graphical object is viewable through said second display screen; and
    a user interface for enabling interaction with at least one display screen selected from a group consisting of said first display screen and said second display screen, wherein said user interface comprises at least one user interface element for activation by a user, and wherein said user interface overlaps a viewable area of at least one display screen selected from a group consisting of said first and second display screens.

2. The interactive imaging system of claim 1, wherein said first and second graphical objects represent a single, three-dimensional object.

3. The interactive imaging system of claim 1, wherein said first and second graphical objects each represent a different object with a different respective depth.

4. The interactive imaging system of claim 1, wherein said at least one user interface element is selected from a group consisting of a button and a joystick.

5. The interactive imaging system of claim 1, wherein said at least one user interface element is mechanically actuated.

6. The interactive imaging system of claim 1, wherein said user interface comprises a touch-sensitive material, and wherein said at least one user interface element is associated with a portion of said touch-sensitive material.

7. The interactive imaging system of claim 1, wherein said user interface is located on a panel overlapping said first and second display screens.

8. The interactive imaging system of claim 1, wherein said at least one user interface element is operable to adjust the display of at least one graphical object selected from a group consisting of said first and second graphical objects.

9. The interactive imaging system of claim 1, wherein said at least one user interface element is operable to associate said user interface with at least one specific display screen, wherein said at least one user interface element overlaps said first and second display screens, and wherein elements of said user interface are operable to enable interaction solely with said at least one specific display screen.

10. The interactive imaging system of claim 1, wherein said at least one user interface element is operable to transition display of portions of graphical objects between said first and second display screens.

11. An interactive imaging system comprising:
    a first display screen for displaying a first graphical object, said first graphical object generated using a first active matrix of physical pixels disposed at said first display screen;
    a second display screen for displaying a second graphical object, said second graphical object generated using a first active matrix of physical pixels disposed at said second display screen, said second display screen further for displaying said second graphical object simultaneously with said display of said first graphical object, wherein said second display screen overlaps said first display screen, and wherein a portion of said first graphical object is viewable through said second display screen; and
    a user interface for enabling interaction with at least one display screen selected from a group consisting of said first display screen and said second display screen, wherein said user interface comprises at least one user interface element for activation by a user, and wherein said user interface is located remotely from at least one display screen selected from a group consisting of said first and second display screens.

12. The interactive imaging system of claim 11, wherein said first and second graphical objects represent a single, three-dimensional object.

13. The interactive imaging system of claim 11, wherein said first and second graphical objects each represent a different object with a different respective depth.

14. The interactive imaging system of claim 11, wherein said at least one user interface element is selected from a group consisting of a button and a joystick.

15. The interactive imaging system of claim 11, wherein said at least one user interface element is mechanically actuated.

16. The interactive imaging system of claim 11, wherein said user interface comprises a touch-sensitive material, and wherein said at least one user interface element is associated with a portion of said touch-sensitive material.

17. The interactive imaging system of claim 11, wherein said at least one user interface element is operable to adjust the display of at least one graphical object selected from a group consisting of said first and second graphical objects.

18. The interactive imaging system of claim 11, wherein said at least one user interface element is operable to associate said user interface with at least one specific display screen, wherein elements of said user interface are operable to enable interaction solely with said at least one specific display screen.

19. The interactive imaging system of claim 11, wherein said at least one user interface element is operable to transition display of portions of graphical objects between said first and second display screens.

20. A method of interacting with a multi-layer display comprising a first display screen and a second display screen, said method comprising:
providing an overlapping arrangement of said first and second display screens;
simultaneously displaying a first graphical object on said first display screen and a second graphical object on said second display screen, said displaying comprising generating said first and second graphical objects using a respective active matrix of physical pixels disposed at each of said first and second display screens, and wherein a portion of said first graphical object is viewable through said second display screen; and
adjusting a display of at least one of said first and second graphical objects in response to an interaction with a user interface associated with at least one display screen selected from a group consisting of said first and second display screens.

21. The method of claim 20, wherein said first and second graphical objects represent a single, three-dimensional object.

22. The method of claim 20, wherein said first and second graphical objects each represent a different object with a different respective depth.

23. The method of claim 20, wherein said user interface comprises at least one user interface element.

24. The method of claim 23, wherein said at least one user interface element is selected from a group consisting of a button and a joystick.

25. The method of claim 23, wherein said at least one user interface element is mechanically actuated.

26. The method of claim 23, wherein said user interface comprises a touch-sensitive material, and wherein said at least one user interface element is associated with a portion of said touch-sensitive material.

27. The method of claim 20, wherein said adjusting said display comprises transitioning display of portions of graphical objects between said first and second display screens.

28. An interactive imaging system comprising:
a first display including a first plurality of pixels operable to generate images of objects, the first plurality of pixels comprising a first active matrix of physical pixels disposed at the first display screen, the first display being operable to display a first graphical object using at least a portion of the first plurality of pixels;
a second display including a second plurality of pixels operable to generate images of objects, the second plurality of pixels comprising a second active matrix of physical pixels disposed at the second display screen, the second display being operable to display a second graphical object using at least a portion of the second plurality of pixels, the second display being further operable to display the second graphical object simultaneously with the display of the first graphical object;
wherein at least a portion of the second display overlaps with at least a portion of the first display;
wherein a portion of the first graphical object is viewable through the second display;
a user interface for enabling interaction with at least one display selected from a group consisting of: the first display and the second display; and
wherein the user interface comprises at least one user interface element for activation by a user, and wherein the user interface overlaps a viewable area of at least one display selected from a group consisting of: the first display and the second display.

29. The interactive imaging system of claim 28, wherein said at least one user interface element is selected from a group consisting of a button and a joystick.

30. The interactive imaging system of claim 28, wherein said user interface comprises a touch-sensitive material, and wherein said at least one user interface element is associated with a portion of said touch-sensitive material.

31. The interactive imaging system of claim 28, wherein said at least one user interface element is operable to associate said user interface with at least one specific display screen, wherein said at least one user interface element overlaps said first and second display screens, and wherein elements of said user interface are operable to enable interaction solely with said at least one specific display screen.

32. The interactive imaging system of claim 28, wherein said at least one user interface element is operable to transition display of portions of graphical objects between said first and second display screens.

33. An interactive imaging system comprising:
means for providing an overlapping arrangement of said first and second display screens;
means for simultaneously displaying a first graphical object on said first display screen and a second graphical object on said second display screen, said displaying comprising generating said first and second graphical objects using a respective active matrix of physical pixels disposed at each of said first and second display screens, and wherein a portion of said first graphical object is viewable through said second display screen; and
means for adjusting a display of at least one of said first and second graphical objects in response to an interaction with a user interface associated with at least one display screen selected from a group consisting of said first and second display screens.

34. The interactive imaging system of claim 33, wherein said first and second graphical objects represent a single, three-dimensional object.

35. The interactive imaging system of claim 33, wherein said first and second graphical objects each represent a different object with a different respective depth.

36. The interactive imaging system of claim 33, wherein said user interface comprises at least one user interface element.

37. The interactive imaging system of claim 33, wherein said means for adjusting said display is further operable to transition display of portions of graphical objects between said first and second display screens.

* * * * *